(12) United States Patent
Parrish (10) Patent No.: US 7,114,017 B2
(45) Date of Patent: Sep. 26, 2006

(54) PROGRAMMABLE PERIPHERAL SWITCH

(75) Inventor: Donald L. Parrish, Huntsville, AL (US)

(73) Assignee: The Mitre Corporation, McLean, VA (US)

( * ) Notice: Subject to any disclaimer, the term of this patent is extended or adjusted under 35 U.S.C. 154(b) by 392 days.

(21) Appl. No.: 10/806,233

(22) Filed: Mar. 23, 2004

(65) Prior Publication Data

US 2005/0216619 A1 Sep. 29, 2005

(51) Int. Cl.
  *G06F 13/12* (2006.01)
  *G06F 13/20* (2006.01)
(52) U.S. Cl. .......................... 710/62; 710/313
(58) Field of Classification Search .................. None
  See application file for complete search history.

(56) References Cited

U.S. PATENT DOCUMENTS

| | | | |
|---|---|---|---|
| 4,608,663 A | 8/1986 | Gordon | |
| 4,866,667 A | 9/1989 | Shimada | |
| 5,307,462 A | 4/1994 | Hastings | |
| 5,461,717 A | 10/1995 | Notarianni et al. | |
| 5,499,377 A | 3/1996 | Lee | |
| 5,504,878 A | 4/1996 | Coscarella et al. | |
| 5,638,521 A | 6/1997 | Buchala et al. | |
| 5,682,422 A | 10/1997 | Oliver | |
| 5,752,048 A * | 5/1998 | Antol et al. | 713/323 |
| 5,961,624 A | 10/1999 | Takayama | |
| 6,073,188 A | 6/2000 | Fleming | |
| 6,185,427 B1 | 2/2001 | Krasner et al. | |
| 6,308,239 B1 | 10/2001 | Osakada et al. | |
| 6,324,586 B1 | 11/2001 | Johnson | |
| 6,378,009 B1 | 4/2002 | Pinkston, II et al. | |
| 6,378,014 B1 | 4/2002 | Shirley | |
| 6,388,658 B1 | 5/2002 | Ahern et al. | |
| 6,957,287 B1 * | 10/2005 | Lou et al. | 710/72 |
| 2003/0093599 A1 * | 5/2003 | Lou et al. | 710/72 |
| 2005/0283563 A1 * | 12/2005 | Lou et al. | 710/316 |

* cited by examiner

*Primary Examiner*—Fritz Fleming
*Assistant Examiner*—David Martinez
(74) *Attorney, Agent, or Firm*—Rosenberg, Klein & Lee (57) ABSTRACT

A peripheral switch (62) is electrically interposed between a peripheral device (10) and a plurality of computing devices respectively coupled to host computer ports (70a)–(70N). The peripheral switch (62) includes host computer port state sensing means (110) for determining a state of each host computer port (70a)–(70N) and providing a communication path to the peripheral device (10) from a host computer port (70a)–(70N) at a state indicative of a server computer being coupled thereto. The peripheral switch (62) further includes local handshaking means (120) for simulating communications from a server computer to peripheral device (10) if none of host computer ports (70a)–(70N) are determined to be coupled to a server computer.

21 Claims, 7 Drawing Sheets

PROGRAMMABLE PERIPHERAL SWITCH

BACKGROUND OF THE INVENTION

1. Field of the Invention

The invention described herein is related to switching devices for sharing a peripheral device among a plurality of computing devices. More specifically, the present invention selectively connects a peripheral device to one of a plurality of computing devices that presents a predetermined state at a communication port thereof and for simulating an active communication link between a computing device and the peripheral device when a computing device at the predetermined state is not available among the plurality of computing devices.

2. Description of the Prior Art

Figure 1:
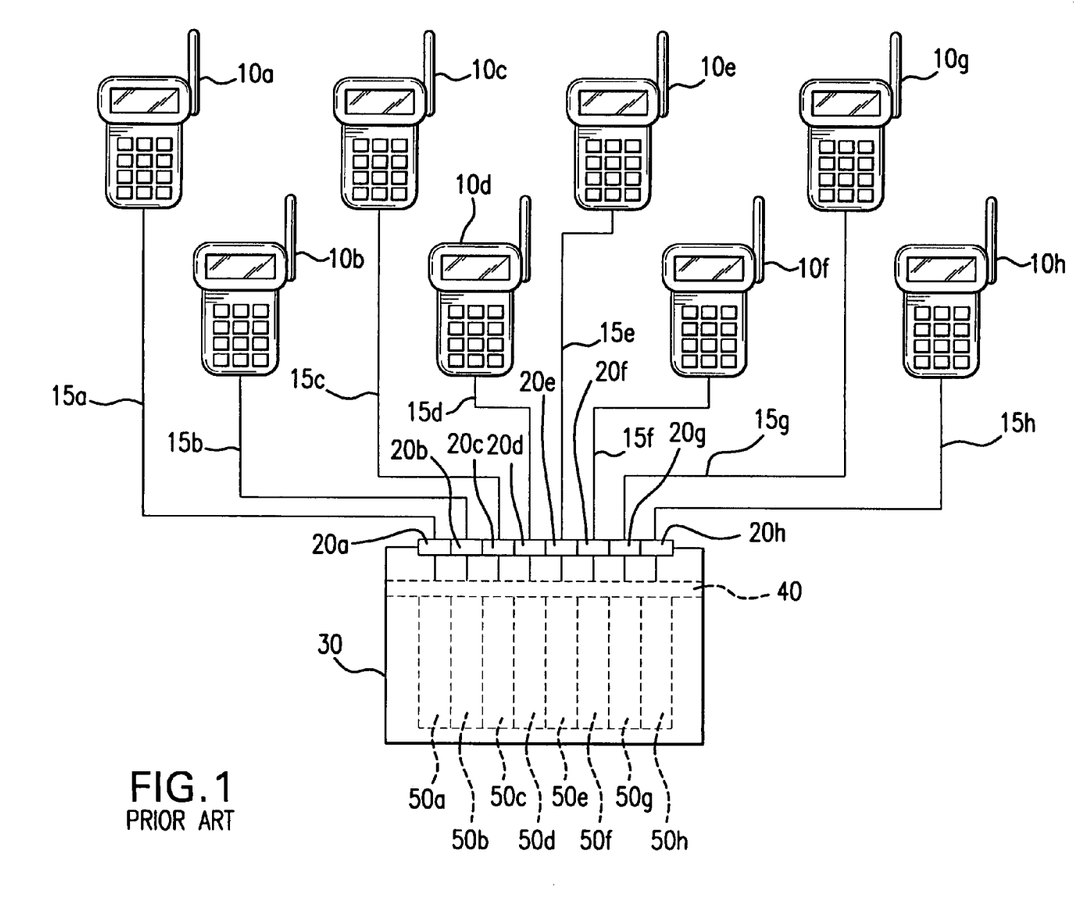
FIG. 1 is a block diagram of a prior art computing network utilizing dedicated peripherals for each of separate computing platforms.

Referring to FIG. 1, there is shown an exemplary network architecture found in, for example, tactical military environments. The network consists of a plurality of computing devices, such as single board computer (SBCs) 50a–50h electrically coupled to back plane 40 and mechanically secured within chassis 30. Each computing device 50a–50h is electrically coupled to a corresponding peripheral device, such as precision lightweight global positioning system receivers (PLGRs) 10a–10h. Each peripheral device 10a–10h is coupled to a corresponding chassis port 20a–20h via communications cable 15a–15h, respectively. Individual communication paths are separately maintained between the peripheral device 10a–10h and its corresponding computing device 50a–50h. The electrical connection between the peripheral port 20a–20h and its corresponding computing device 50a–50h may be hard-wired directly or may be distributed in conductors along the back plane 40.

It is apparent from FIG. 1 that the redundancy of the components of the depicted network can be extremely costly. For example, each PLGR 10a–10h of the network may cost hundreds, if not thousands, of dollars. However, in some applications, the parallel structure, i.e., each single board computer 50a–50h coupled to its own PLGR 10a–10h, respectively, may be necessary or unavoidable. For example, each single board computer 50a–50h may be dedicated to a specific application and may be executing the program code therefore under separate and distinct operating systems. Each of the single applications being executed on the single board computers 50a–50h may require its own set of global positioning system (GPS) data and, therefore, requires a dedicated PLGR.

Figure 2:
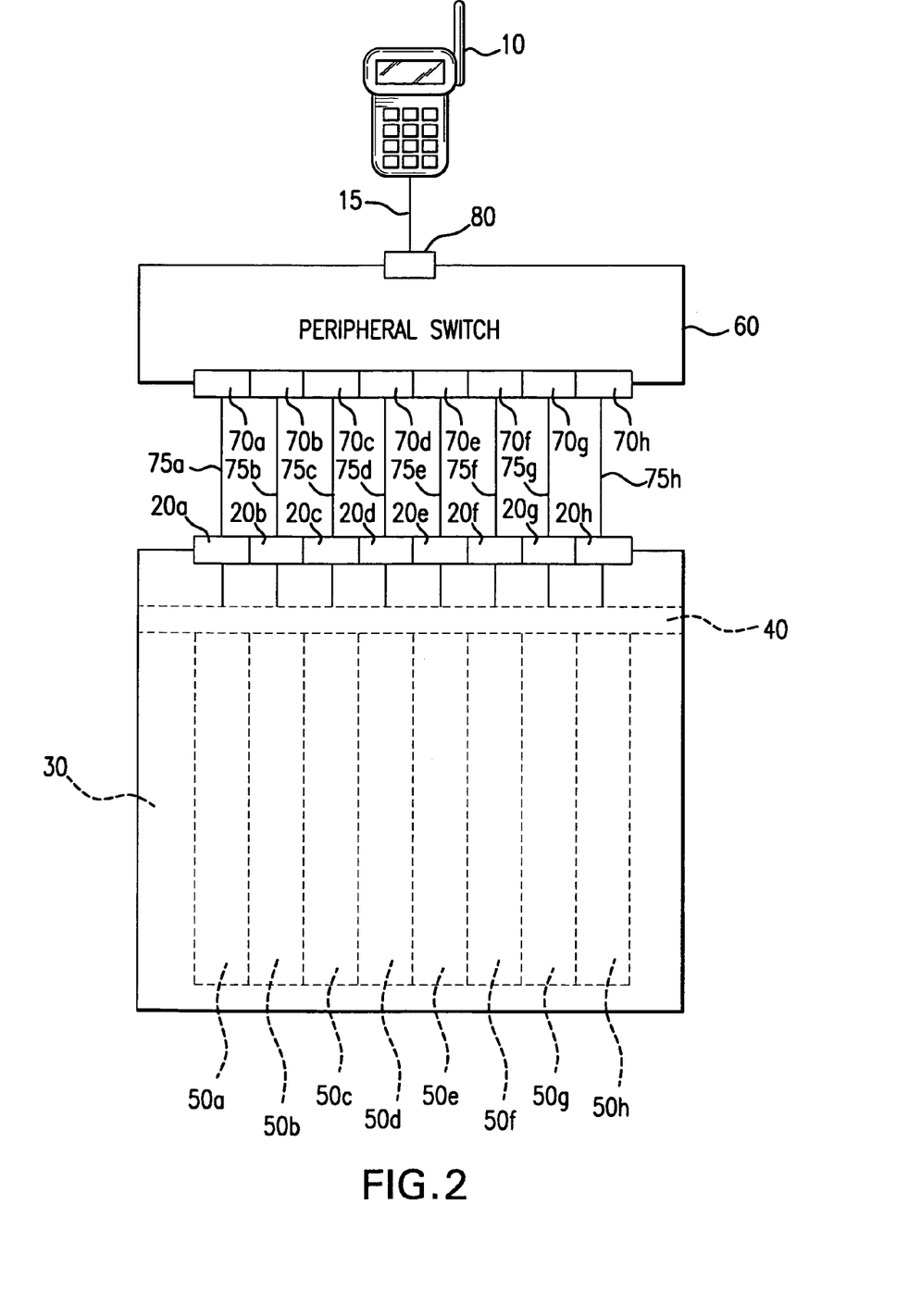
FIG. 2 is a block diagram of a shared peripheral computing network.

One alternative to the redundancy of peripheral devices is to interpose a peripheral switch 60 between a single peripheral device 10 and the plurality of computing devices 50a–50h, as is illustrated in FIG. 2. Through peripheral switch 60, a single communication path may be selectively established between the peripheral device 10, coupled at peripheral port 80, and each of the single board computers 50a–50h, coupled at host computer ports 70a–70h of peripheral switch 60 and computer chassis ports 20a–20h of computer chassis 30.

Peripheral sharing switches are well-known in the art. U.S. Pat. No. 4,608,663 to Gordon discloses a computer network incorporating a switch by which more than one computer shares a common peripheral. The switch searches for hosts with an active request line. Hosts gain access to the peripheral based upon a predetermined search sequence and upon the discovery, in the predetermined search sequence, of an active request line. Such switches may be useful for simple networks, but may not be used for distributing the functionality of the peripheral to a number of differently configured computer systems, each requiring a unique communication protocol. Moreover, the peripheral switch of Gordon cannot be effectively utilized to establish a communication between a peripheral requiring a particular host computer signature and a particular computing device in possession of the host computer signature. Such is the case of PLGR 10 of FIG. 2, which requires a host computer configured as a server computer having a particular state in order to connect therewith. Such a server computer may be connected at any of the host computer ports 70a–70h and the switch of Gordon is not equipped to locate the server computer at any given instant of time so that communication with the PLGR 10 can be established.

Another peripheral switch of the prior art is disclosed in U.S. Pat. No. 5,307,462 to Hastings. The peripheral sharing device of Hastings allows multiple hosts to share a single peripheral such as a printer or a fax machine. The switch relies on stored peripheral state information to restore the peripheral to a previous configuration when one host is finished with the peripheral. It is assumed that the peripheral changes state when the host requires it and that the peripheral has no requirements as to the state of the host. However, if the peripheral were such that it would change state depending on the availability and operating status of a host (e.g., going into a "sleep" state when a host does not require it), a network incorporating the switch of Hastings would behave erratically when the peripheral automatically changed its operating mode and a host was expecting a "ready" peripheral with which to connect.

Another approach to peripheral sharing is disclosed in U.S. Pat. No. 6,308,239 to Osakada, et al., which utilizes features of the universal serial bus architecture and communication protocol. The switch of Osakada, et al. allows flexible means for connecting a peripheral to a host computer, however, the host must request the switching action. Thus, the switch disclosed by Osakada, et al. has limited applicability when the peripheral actively searches its connection for a specific host signature. Further, the switch of Osakada, et al. does not provide means for preventing the peripheral from reverting to a secondary mode of operation should there be a failure to find a host of the specified signature.

In light of the foregoing discussion, there exists a need in the field of peripheral sharing for a peripheral switch that shares the functionality of a single peripheral among a plurality of distinctly configured computers. There is a further need for a peripheral switch which provides a default communication with the peripheral when a server computer, or a computer with a particular configuration, cannot be found. Furthermore, there is the need for the peripheral switch to be programmable to accommodate various network changes.

SUMMARY OF THE INVENTION

To overcome the shortcomings of the prior art, the present invention is directed to a programmable peripheral switch for selectively connecting a peripheral device to a server computing device. The programmable peripheral switch includes a peripheral port for electrically coupling the peripheral device thereto, a plurality of host ports, each of which is electrically coupled to a respective computing device, host port state detection means for detecting the state of each of the host computer ports, switching means for providing a communication path between the peripheral device and one of the host computer ports which is at a state indicative of the server computing device being coupled thereto and local handshaking means for simulating communication from the server computing device to the peripheral device if the server computing device is not coupled to any of the host computer ports. The programmable peripheral switch of the present invention may further include protocol conversion means for converting the communications protocol of the peripheral device to that of the computing device coupled to a respective host computer port, program code execution and storage means for executing and storing programmed instructions and program code alteration means for altering the programmed instructions.

The present invention is also directed to an associated method for selectively connecting a peripheral device to a server computing device using the programmable peripheral switch described above. The method includes the steps of determining the operational state of each host computer using the host port state detection means, establishing a communication path using the switching means between the peripheral device and the host computer port identified as being coupled to the server computing device, and simulating a communication from the server computing device to the peripheral device using the local handshaking means if none of the plurality of host computer ports is at a state indicative of the server computing device being coupled thereto.

DETAILED DESCRIPTION OF THE PREFERRED EMBODIMENTS

Referring once again to FIG. 2, peripheral switch 60 of the present invention is electrically coupled to PLGR 10 at peripheral port 80 via communication cable 15. In this exemplary embodiment, PLGR 10 may operate in a plurality of modes including, but not restricted to, a "standard" mode, in which control data and instrumentation data are communicated from the PLGR to a server computer and a "sleep" mode in which the PLGR 10 powers down many of its features so as to conserve battery power.

During operation in the standard mode, the PLGR 10 periodically transmits a default message, such as "buffer box status request" to the server computer requesting the status of its output buffer. If the PLGR 10 does not receive a response to the default message, it will place itself into the sleep mode to conserve battery power. If the PLGR 10 is dedicated to a single computing platform, such as one of the single board computers 50a–50h of FIG. 2, PLGR 10 going into sleep mode does not pose a significant problem. This is because the dedicated server computer may issue a wake-up command when the PLGR 10 is once again needed. However, when a single PLGR 10 is to be shared through peripheral switch 60, PLGR 10 entering into the sleep mode can prevent proper operation of the peripheral switch 60, as will be discussed in paragraphs below.

Single board computers 50a–50h are electrically coupled to peripheral switch 60 at host computer ports 70a–70h, respectively, via chassis computer ports 20a–20h and communication cables 75a–75h, respectively. As previously stated, single board computers 50a–50h may be operating under separate and distinct operating systems and, as will be discussed further below, peripheral switch 60 must have the capability to convert the messaging protocol of PLGR 10 to the communication protocol of each of the single board computers 50a–50h.

As will be described in detail in paragraphs that follow, peripheral switch 60 determines the status of host computer ports 70a–70h to determine if an active server computer is present thereat. A server computer is one seeking to capture the use of PLGR 10 and does so by placing specific data information onto its host computer port. Peripheral switch 60, recognizing the status at a particular host computer port 70a–70h as that of a server computer, establishes a communication path to the peripheral port 80 in response thereto. The switching of the communication path at peripheral switch 60 is done transparently to PLGR 10. Further, as will be discussed below, if a server computer is not located within a predetermined period of time, peripheral switch 60 will transmit a default data message, such as an acknowledge or "ACK" message to PLGR 10 via peripheral port 80 so as to prevent PLGR 10 from entering the sleep mode.

Several advantageous features of the peripheral switch of the present invention may be best described with reference to the block diagram of FIG. 3. As is shown in the Figure, peripheral switch 62 includes N host computer ports 70a–70N. Each of the host computer ports 72a–72N is respectively coupled to multiplexer 130 via lines 72a–72n.

Multiplexer 130 acts as a switching means for selectively coupling one of lines 72a–72N to line 82 at the output terminal thereof.

Each of the host computer ports 70a–70N are further coupled to host computer port state sensor 110 through their respective communication line 72a–72N. Host computer port state sensor 110 monitors each of the host computer ports 70a–70N for a state indicative of a server computer coupled thereto. In one embodiment of the present invention, host computer port state sensor 110 monitors the host computer ports 70a–70N for any message activity and further monitors the message activity for a specific header message sequence. The host computer port state sensor 110 will recognize the specific header message sequence as that belonging to a communication protocol of PLGR 10. Host computer port state sensor 110 outputs to multiplexer 130 the ID of the host computer port to which the server computer is coupled on select line 105. Responsive to the host computer port ID, multiplexer 130 establishes a communication path between the respective one of host computer port communication lines 72a–72N and peripheral port communication line 82.

Host computer port state sensor 110 also determines if there is a complete absence of a server computer coupled to peripheral switch 62. In one embodiment, each of the host computer ports 72a–72N is coupled to a default state generator, to be discussed further below, which indicates that the host computer port is free and does not have a computing device coupled thereto. Additionally, host computer port state sensor 110 may monitor the host computer ports 72a–72N for a predetermined period of time and, upon that time elapsing, if no header message sequence indicative of a server computer requesting access to PLGR 10 has been detected, host computer port state sensor 110 will infer that a server computer is not coupled to the switch. When it has been determined that a server computer is not coupled to the switch, host computer port state sensor 110 will notify the local handshaking section 120 via line 115.

Local handshaking section 120 simulates communication from a host computer port to the peripheral port so as to prevent PLGR 10 from entering its sleep mode. In one embodiment of the present invention, local handshaking section 120 simply issues an acknowledge or "ACK" message to the peripheral port 80 over line 84 in accordance with the required response time of PLGR 10. If PLGR 10 were allowed to enter its sleep mode, a server computer coupled to one of the host computer ports 70a–70N would be required to issue a reset command prior to making any other command or receiving GPS data. This would not only introduce timing problems, but would further introduce a prohibitive slowing down of the overall system. That is to say, every time a server computer wishes to connect to the peripheral port, it must issue a reset command and then wait a period of time for the PLGR 10 to enter the standard mode. Although additional circuitry could be added to the peripheral switch 62 to monitor the operational state of peripheral port 80, the delays in time to establish an active connection between a server computer and the PLGR 10 would still be prohibitive. Without the additional circuitry, the server computer must wait to ensure that PLGR 10 has adequate time to enter the standard mode and adding circuitry to monitor the status of the peripheral port would not overcome the prohibitive delays. Thus, it is an advantageous feature of the present invention to incorporate the local handshaking section 120 so as to prevent the peripheral from entering a standby or sleep mode.

Host computer port state sensor 110 and local handshaking section 120 may, in certain embodiments, be combined into a single control section 100 as indicated by the dashed lines so enumerated. Control section 100 may be implemented in hardware such as through a complex programmable logic device (CPLD) or similar logic device or a combination of logical building elements, or may be implemented in software as executed on a micro-controller or micro-processor. The implementation of the control section 100 will be discussed further with reference to FIG. 5A and FIG. 5B.

Figure 4:
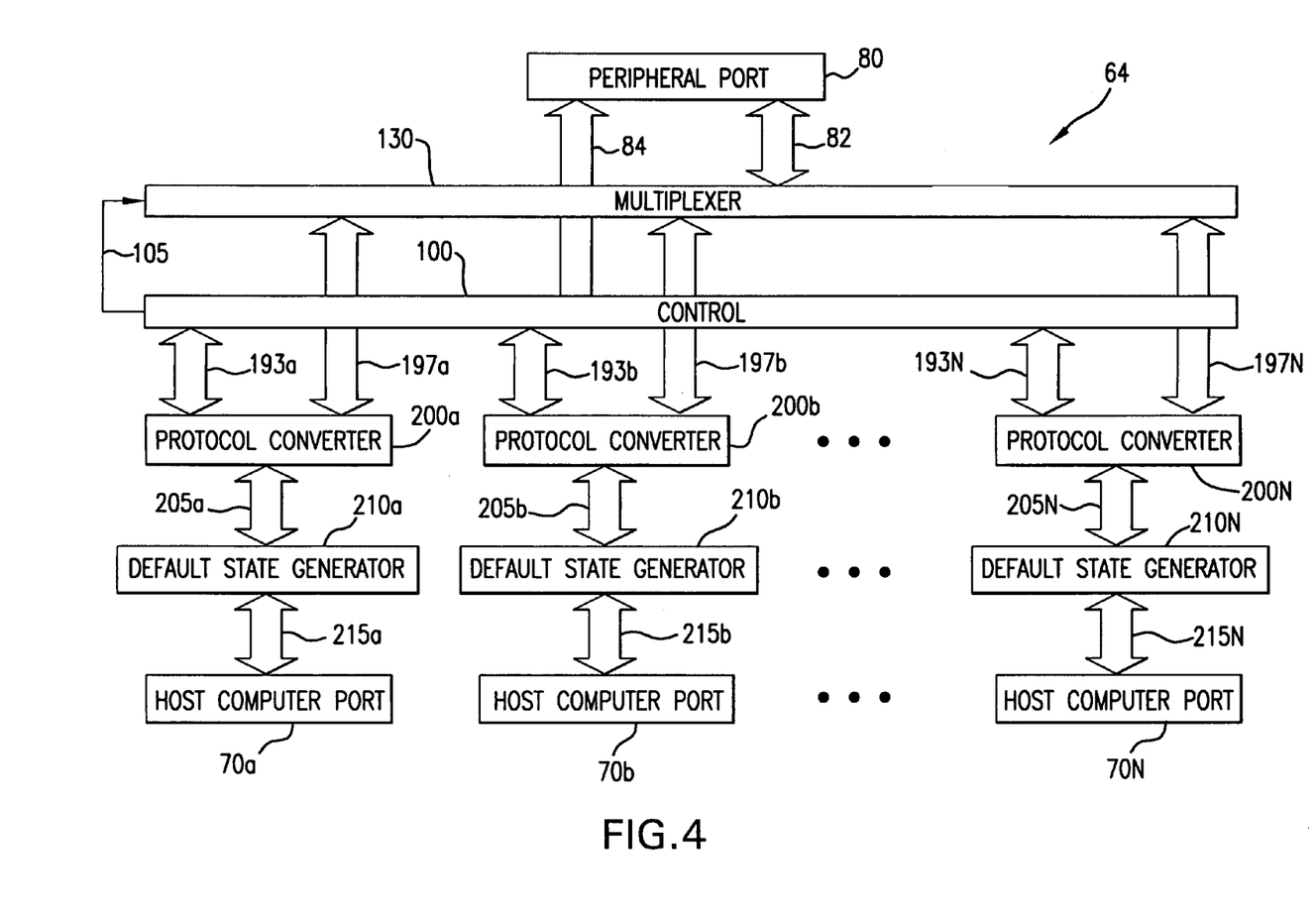
FIG. 4 is a block diagram of a peripheral sharing switch of the present invention revealing advantageous features.

Referring now to FIG. 4, there is shown a further embodiment of the peripheral switch of the present invention, generally indicated at 64. As with other embodiments of the present invention, peripheral switch 64 includes a peripheral port 80 coupled to a multiplexer 130 through peripheral port communication line 82. The peripheral switch further includes a control section 100 for monitoring the host computer port to which a server computer is connected. The host computer port ID is communicated to multiplexer 130 through selection line 105. Control section further includes local handshaking means, as in previous embodiments, for simulating a communication between a server computer and a peripheral coupled to peripheral port 80 should no server computer be connected at any of the host computer ports 70a–70N.

As previously stated, each computing device coupled to one of host computer ports 70a–70N may have separately distinct configurations in both hardware and software. Moreover, the communication protocol of each computing device may be different than the communication protocol of the peripheral coupled to peripheral port 80. To accommodate a wide variety of hardware, software, and communication configurations, peripheral switch 64 includes a plurality of protocol converters 200a–200N respectively coupled to each host computer port 70a–70N. Each protocol converter 200a–200N transforms the transmitted data from the respective computing device coupled to host computer ports 70a–70N into a format compatible with the peripheral device coupled to peripheral port 80. Thus, whereas each protocol converter 200a–200N may be configured to receive and transmit data in different communication formats to host computer ports 70a–70N, respectively, all protocol converters 200a–200N communicate to the peripheral port 80 using the same communication protocol, i.e., the protocol of peripheral device coupled to peripheral port 80.

In certain embodiments of peripheral switch 64, protocol converters 200a–200N may be simply a byte re-ordering device, while in other embodiments, protocol converters 200a–200N may convert serial digital data to parallel digital data. Other embodiments of protocol converters 200a–200N convert single ended digital serial data (e.g., RS-232 formatted serial data) into differential serial digital data (e.g., RS-422 serial data). Many other protocol conversion devices are well-known in the art and may be incorporated into peripheral switch 64 while remaining within the scope of the present invention.

As is shown in FIG. 4, protocol converter 200*a*–200N are coupled to control section 100 through communication lines 193*a*–193N, respectively, and to multiplexer 130 via communication lines 197*a*–197N, respectively. While this configuration assumes that control section 100 of peripheral switch 64 operates under the communication protocol of the peripheral device coupled to peripheral port 80, such is not necessary for proper operation of switch 64. Protocol converter 200*a*–200N may include means by which a separate communication protocol, for use exclusively by control section 100, may be implemented within peripheral switch 64. Thus, communications over communication lines 193*a*–193N would be in the communication protocol of control section 100. Obviously, however, communication from local handshaking section 120 of control section 100 over line 84 to peripheral port 80 would be required to be in the communication protocol of the peripheral device.

In the exemplary embodiment of FIG. 4, a default state generator 210*a*–210N is coupled to host computer port 70*a*–70N, respectively through communication lines 215*a*–215N. Default state generator 210*a*–210N is also coupled to control section 100 through communications lines 205*a*–205N, respectively, either through protocol converter 200*a*–200N, respectively, or directly to control section 100. Default state generator 210*a*–210N maintains host computer port 70*a*–70N, respectively, at a predetermined state when a computing device is not coupled thereto. That is to say, default state generator 210*a*–210N prevents host computer port 70*a*–70N, respectively, from "floating" when a computing device is removed therefrom. Circuits for preventing input lines and output lines of digital circuits from floating are well-known in the art and examples thereof are given in FIG. 5A and FIG. 5B.

Figure 5A:
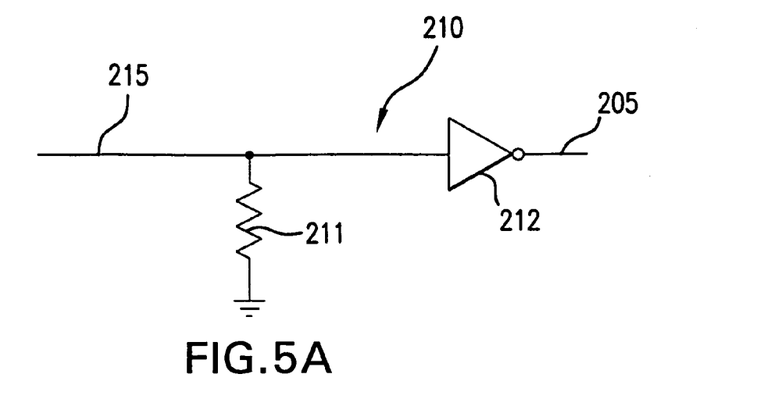
FIG. 5A and FIG. 5B are block diagrams of implementations of the program execution and storage means of the present invention.

Referring to FIG. 5A, there is shown one embodiment of a default state generator 210 for use with a single-ended serial digital data transmission port. A pull-down resistor 211 is coupled to input line 215 and the input of inverter 212. Thus, output line 205 remains in a logical "one" state unless input line 215 is pulled to a logical "one" state by a computing device coupled to host computer port 70*a*–70N. The logic "one" state at output line 205 is recognized by control section 100 to mean that there is not a computing device attached to that respective port.

Figure 5B:
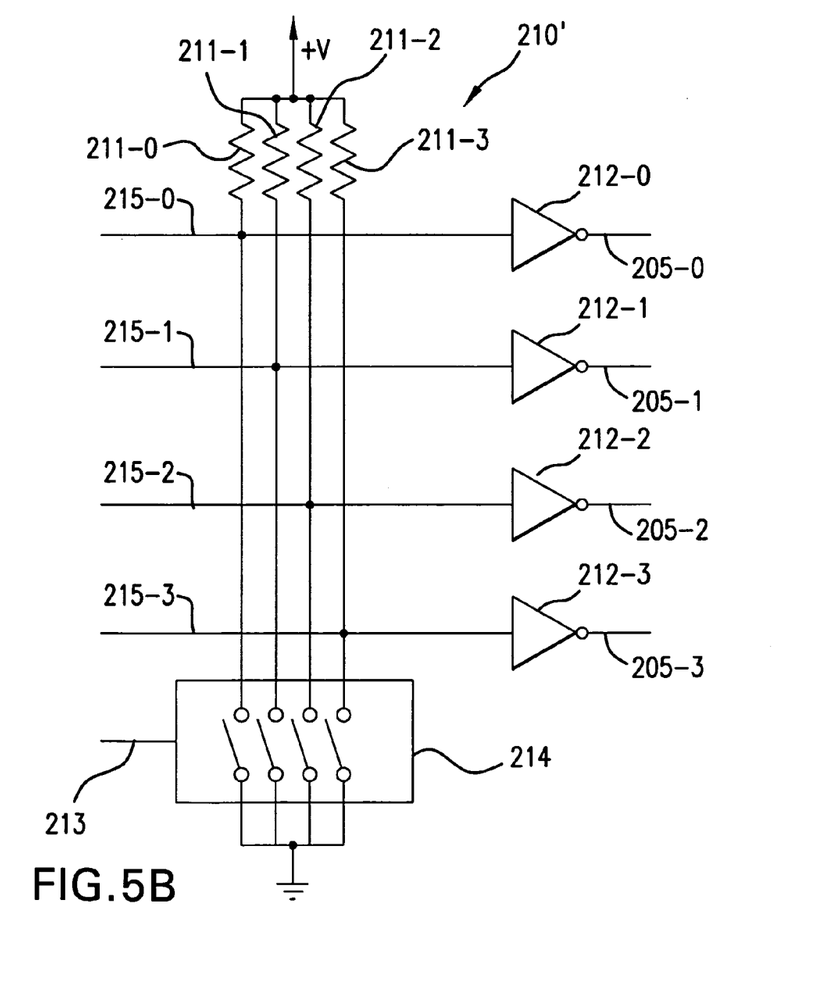

A default state generator 210' for use with a four-bit parallel digital data host computer port is schematically depicted in FIG. 5B. Pull-up resistors 211-0, 211-1, 211-2, and 211-3 are respectively coupled to input lines 215-0, 215-1, 215-2, and 215-3. The input lines are also coupled to switch 214 which may be controlled by control line 213 or may be of manual DIP switch design known in the art or an equivalent thereof. By selectively opening and closing switching elements of switch 214, a default data word indicative of an empty host computer port is formed at the outputs of inverters 212-0, 212-1, 212-2, and 212-3. The parallel data word is transferred to control section 100 via output lines 205-0, 205-1, 205-2, and 205-3.

Whereas the default state generators of FIG. 5A and FIG. 5B are shown using pull-down and pull-up resistive elements, respectively, to form a data word indicative of the host computer port to which it is connected, is empty, i.e., not coupled to a computing device, other means for forming the default state data word are known in the art and may be used without deviating from the scope of the present invention.

An advantageous feature of certain embodiments of the present invention provide field programmability of the peripheral switch. Field programmability allows a tremendous amount of flexibility in adapting the switch to changing computer technologies, communication protocols, and the command and response set of the peripheral device.

Figure 6A:
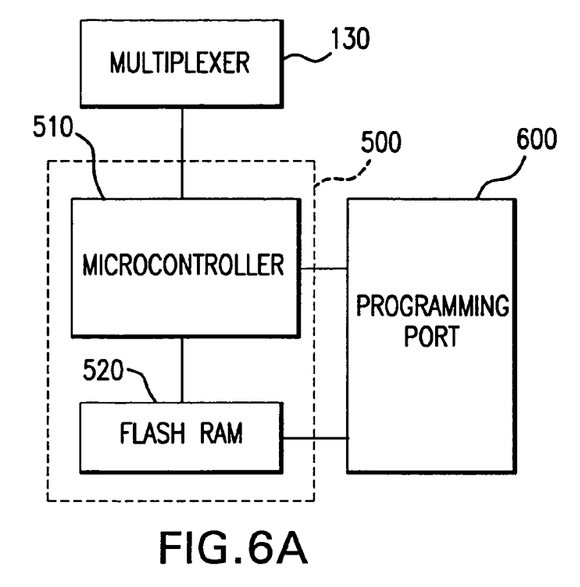
FIG. 6A and FIG. 6B are schematic diagrams of certain embodiments of the default state generation means of the present invention.

As is shown in FIG. 6A, a program execution and storage device 500 consists of a microcontroller 510 electrically coupled to flash RAM 520. Flash RAM 520 may hold executable program code to perform the functions of various components of the peripheral switch, e.g., the host computer port state sensing, local handshaking, and protocol conversion. The flash RAM 520 may also have in storage a set of peripheral command codes and a corresponding set of peripheral response codes. This allows the peripheral switch to simulate communications from a server computer in the physical absence thereof.

To alter the contents of flash RAM 520, there is provided a programming port 600 which is provided, as is well-known in the art, to reconfigure the contents of flash RAM 520. Programming port 600 may be any type of communication port capable of altering flash RAM and simultaneously being coupled to a source of new data that is to replace the contents of flash RAM 520. Typical sources of replacement data include, but are not limited to, a computing device, such as a laptop computer with a serial communication port, a flash RAM programmer and a solid state USB removable storage device.

Figure 6B:
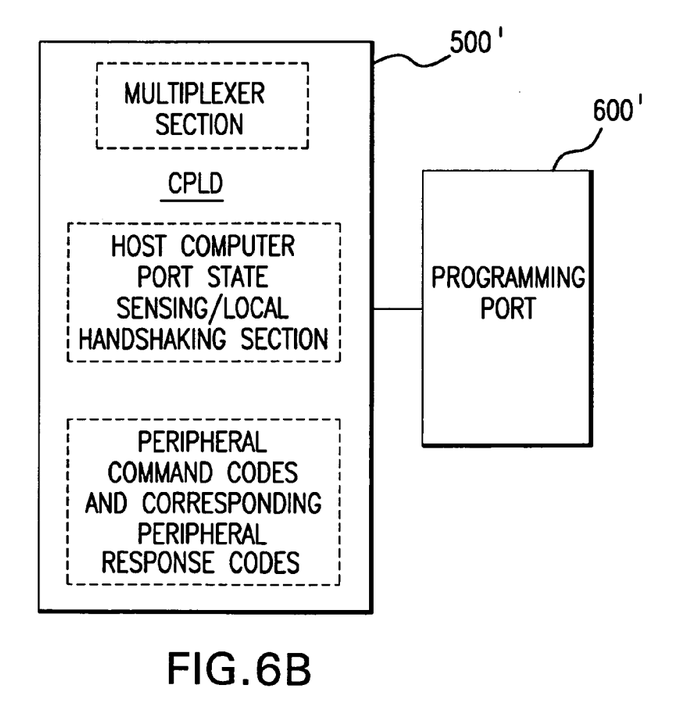

An alternate configuration for the program execution and storage section 500' is illustrated in FIG. 6B. Program execution and storage section 500' is a complex programmable logic device such as is well-known in the art. The CPLD may be programmed to perform the functions of much of the peripheral switch as described with reference to FIG. 6A. For the CPLD, programming port 600' has the same requirements as the programming port 600 of FIG. 6A with the obvious exception that it must be capable to transfer instructions to the CPLD so that it may be reconfigured.

Figure 3:
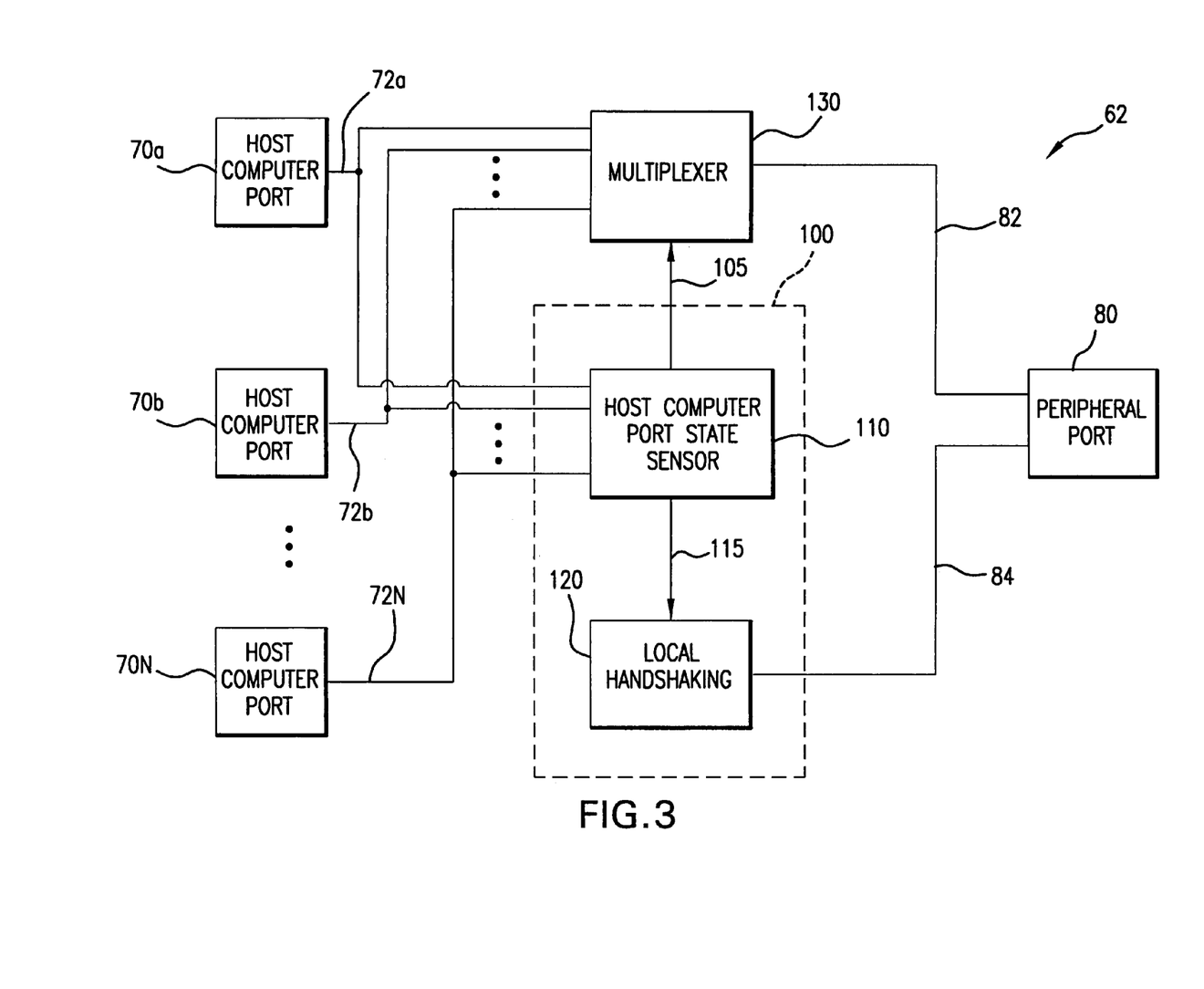
FIG. 3 is a block diagram of the fundamental components of the peripheral switch of the present invention.
Figure 7:
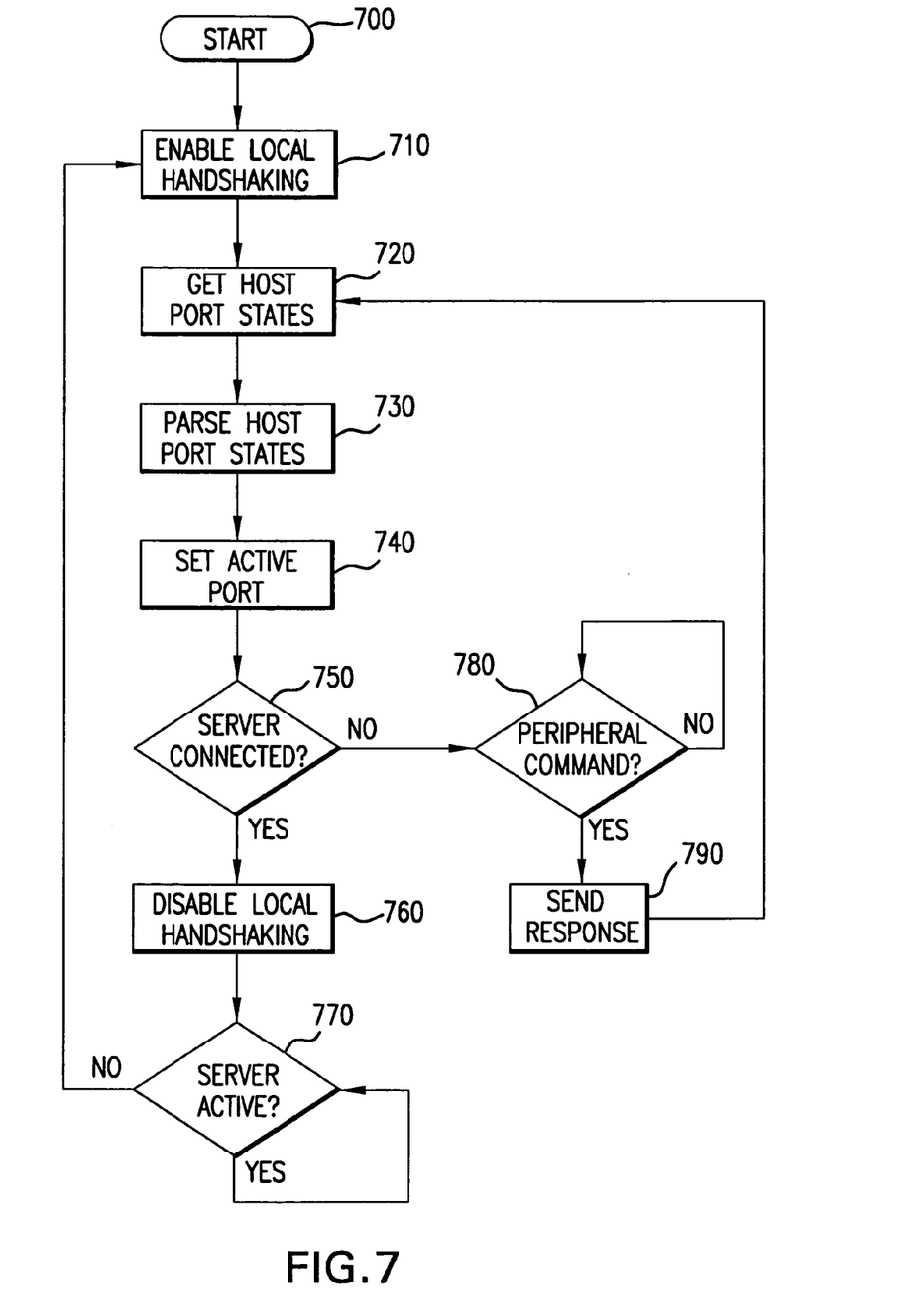
FIG. 7 is a flow chart of the method associated with the programmable peripheral switch of the present invention.

Operation of the programmable peripheral switch of the present invention is illustrated in the flow chart of FIG. 7 and with reference to the system diagram of FIG. 3. As is shown in FIG. 7, the process begins at start block 700 in which the system is initialized to an arbitrary but known initial state. The process flow is then transferred to block 710 in which local handshaking section 120 is enabled via control line 115 from the host computer port state sensor 110. Host computer port state sensor 110 then retrieves the port states of each of the host computer ports 70*a*–70N in block 720. The host port states are parsed in block 730 so as to determine if any of the host computer ports 70*a*–70N are coupled to a server computer. Once the host port states are parsed, the switch selects one of the host computer ports 70*a*–70N to be the active port. If none of the host computer ports are coupled to a server computer, the selection of the active port is arbitrary, but known. The peripheral switch then determines if a server computer is coupled to the active port in decision block 750. If a server computer is connected, local handshaking section 120 is disabled in block 760 and then, as is indicated at decision block 770, the server maintains the connection with the peripheral port as long as the server remains active. When the server becomes inactive, as shown by the negative decision path of block 770, the method of the present invention returns to block 710 where the process is repeated.

If, in decision block 750, it is determined that a server is not connected to the active port (which also indicates that a server is not connected on any port as such would have been located in block 730) process flow is transferred to decision block 780 where the peripheral switch awaits a peripheral command from peripheral port 80. In certain embodiments of the present invention, the peripheral device, such as PLGR 10, periodically transmits a default message thereby guaranteeing that the method will not get caught in an infinite loop at decision block 780.

When a peripheral command has been received by the switch, flow is transferred to block 790 where local handshaking means returns an appropriate response. This may be a single response such as an ACK message previously described, or may be a particular response to a command as is would be held in a look-up table stored in program execution and storage section 500 previously described. Once the response has been sent, flow is transferred to block 720 and the method is repeated.

Although the invention has been described herein in conjunction with specific embodiments thereof, many alternatives, modifications, and variations will be apparent to those skilled in the art. The present invention is intended to embrace all such alternatives, modifications, and variations that fall within the spirit and broad scope of the appended Claims.

What is claimed is:

1. A programmable peripheral switch for selectively connecting a peripheral device to a server computing device comprising:
    a peripheral port for electrically coupling the peripheral device thereto;
    a plurality of host computer ports, each of said host computer ports for electrically coupling a respective one of a plurality of computing devices thereto;
    host port state detection means electrically coupled to each of said host computer ports for detecting the state of each of said plurality of host computer ports;
    switching means electrically interposed between said peripheral port and each of said host computer ports for providing a communication path between the peripheral device and one of said host computer ports at a state indicative of the server computing device being coupled thereto; and
    local handshaking means electrically coupled to said peripheral port for simulating communication from the server computing device to the peripheral device if none of said plurality of host computer ports is at said state indicative of the server computing device being coupled thereto.

2. The programmable peripheral switch as recited in claim 1 further including at least one protocol conversion means, each of said protocol conversion means electrically interposed between said peripheral port and a respective one of said plurality of host computer ports, said protocol conversion means for converting a communications protocol of the peripheral device to a communications protocol of a computing device coupled to said respective one of said plurality of host computer ports.

3. The programmable peripheral switch as recited in claim 2, wherein either one of said communications protocol of said peripheral device and said communications protocol of said computing device is a digital serial data communications protocol.

4. The programmable peripheral switch as recited in claim 3, wherein said digital serial data communications protocol transmits data over a single conductor, said data encoded as a voltage on said single conductor as referenced to a common signal ground.

5. The programmable peripheral switch as recited in claim 3, wherein said digital serial data communications protocol transmits data over a pair of conductors, said data encoded as a voltage difference between said pair of conductors as referenced to a common signal ground.

6. The programmable peripheral switch as recited in claim 2, wherein either one of said communications protocol of said peripheral device and said communications protocol of said computing device is a digital parallel data communications protocol.

7. The programmable peripheral switch as recited in claim 1 further including a plurality of default state generating means, each of said plurality of default state generating means electrically coupled to a respective one of said plurality of host computer ports for inducing in the absence of a computing device coupled thereto a predetermined state therein.

8. The programmable peripheral switch as recited in claim 7, wherein said default state generating means includes biasing means for applying a voltage to at least one conductor of said respective host computer port, said voltage indicative of said predetermined state.

9. The programmable peripheral switch as recited in claim 8, wherein said biasing means include a resistor coupled to said at least one conductor and a source of said voltage.

10. The programmable peripheral switch as recited in claim 1 further including program code execution and storage means for executing and storing programmed instructions.

11. The programmable peripheral switch as recited in claim 10, wherein said program code execution and storage means is a microcontroller.

12. The programmable peripheral switch as recited in claim 10, wherein said program code execution and storage means is a complex programmable logic device.

13. The programmable peripheral switch as recited in claim 10 further including program code alteration means coupled to said program code execution and storage means for altering said programmed instructions.

14. The programmable peripheral switch as recited in claim 10, wherein said programmed instructions include a predetermined set of peripheral command codes and a set of corresponding peripheral response codes.

15. The programmable peripheral switch as recited in claim 14, wherein said simulated communication of said local handshaking means includes transmitting one of said set of peripheral response codes to the peripheral device responsive to said corresponding one of said set of peripheral command codes.

16. The programmable peripheral switch as recited in claim 15, wherein said set of peripheral command codes and said set of corresponding peripheral response codes are compatible with a precision lightweight global positioning system receiver.

17. A method for selectively connecting a peripheral device to a server computing device, the method comprising the steps of:
- (a.) providing a programmable peripheral switch including:
  - a peripheral port for electrically coupling the peripheral device thereto;
  - a plurality of host computer ports, each of said host computer ports for electrically coupling a respective one of a plurality of computing devices thereto;
  - host port state detection means electrically coupled to each of said host computer ports;
  - switching means electrically interposed between said peripheral port and each of said host computer ports; and
  - local handshaking means electrically coupled to said peripheral port;
- (b.) electrically coupling the peripheral device to said peripheral port;
- (c.) electrically coupling the server computing device to one of said plurality of host computer ports;
- (d.) determining said operational state of each of said host computer ports using said host port state detection means;
- (e.) establishing a communication path using said switching means between the peripheral device and one of said host computer ports at a state indicative of the server computing device being coupled thereto;
- (f.) simulating communication from the server computing device to the peripheral device using said local handshaking means if none of said plurality of host computer ports is at said state indicative of the server computing device being coupled thereto; and
- (g.) repeating the method at step (d.).

18. The method for selectively connecting a peripheral device to a server computing device as recited in claim 17 further including the step of disabling said local handshaking means if said communications path has been established in step (e.).

19. The method for selectively connecting a peripheral device to a server computing device as recited in claim 17 further including the step of enabling said local handshaking means if the server computing device terminates communication with the peripheral device.

20. The method for selectively connecting a peripheral device to a server computing device as recited in claim 19 further including the step of allowing a predetermined time period to elapse between said enabling of said local handshaking means and said termination of communication between the server computing device and the peripheral device.

21. The method for selectively connecting a peripheral device to a server computing device as recited in claim 17, wherein the communication simulation of step (f.) includes the steps of:
- (1.) waiting for a peripheral command to be received from the peripheral device; and
- (2.) returning to the peripheral device a corresponding peripheral response code to the peripheral device.

\* \* \* \* \*